United States Patent [19]

Barthelemy

[11] Patent Number: 4,991,349

[45] Date of Patent: Feb. 12, 1991

[54] INSULATING WINDOW FOR MOBILE HOMES

[76] Inventor: Timothy H. Barthelemy, 1734 Oak Rd., Grand Tierra Addition, Saint Cloud, Minn. 56301

[21] Appl. No.: 234,488

[22] Filed: Aug. 22, 1988

[51] Int. Cl.⁵ .............................................. E06B 3/32
[52] U.S. Cl. ........................................ 49/61; 49/504; 52/202
[58] Field of Search ................. 49/501, 502, 503, 504, 49/463, 61; 52/72, 200, 202, 207

[56] References Cited

U.S. PATENT DOCUMENTS

| | | | |
|---|---|---|---|
| 2,799,890 | 7/1957 | Stavich | 49/463 |
| 3,052,932 | 9/1962 | Podle | 49/61 |
| 4,134,240 | 1/1979 | Bologna et al. | 52/202 |
| 4,328,644 | 5/1982 | Scott et al. | 49/504 |
| 4,656,778 | 4/1987 | Fiorenza | 49/501 |

FOREIGN PATENT DOCUMENTS

| | | | |
|---|---|---|---|
| 2558373 | 7/1976 | Fed. Rep. of Germany | 49/409 |
| 403262 | 6/1966 | Switzerland | 49/501 |

*Primary Examiner*—Kenneth J. Dorner
*Assistant Examiner*—Gerald A. Anderson
*Attorney, Agent, or Firm*—Moore & Hansen

[57] ABSTRACT

An insulative window assembly for use in portable shelter units such as mobile homes, motor homes and trailers. The assembly is attached to the inside wall of the portable shelter unit surrounding the existing window and window molding, but may be easily removed in warm seasons to regain access to the existing window. The frame of the insulating window assembly is of sufficient depth to allow room for the stem of the crank to which the crank handle is attached for opening and closing a jalousie window assembly. The frame of the insulating window assembly contains insulating, sag resisting chambers which contribute to the heat insulative properties of the insulating window. The frame also contains an inner flange and an outer flange which, when bolted to the inside wall of the portable shelter unit, lends stability to the unit and helps prevent the sag and broken seals that frequently result from the vibration and weather forces to which portable shelter units are particularly vulnerable.

7 Claims, 1 Drawing Sheet

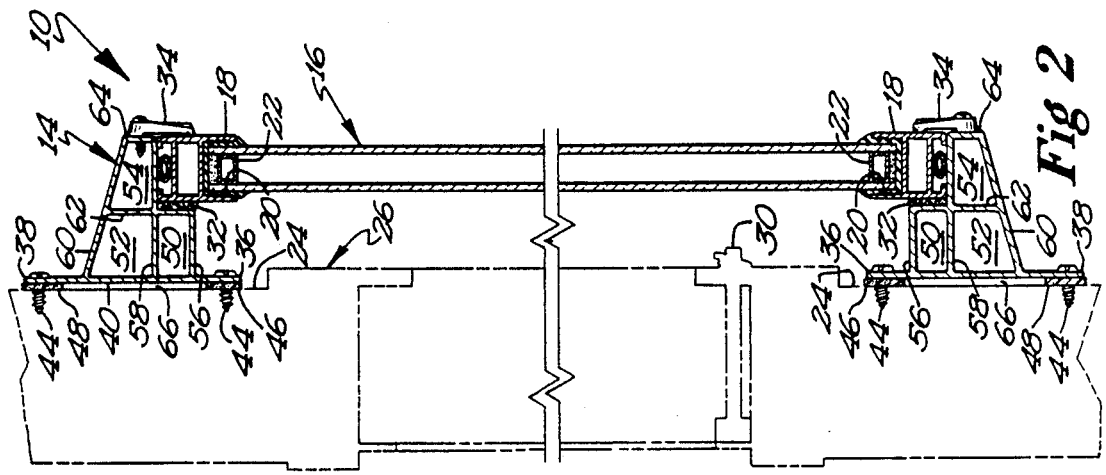

INSULATING WINDOW FOR MOBILE HOMES

BACKGROUND OF THE INVENTION

This invention relates to auxiliary insulating window assemblies which may be attached to the inside wall of mobile homes, trailers and other portable shelter units. These auxiliary insulating windows surround the existing built-in window and frame, providing additional heat insulation in cold weather conditions.

Typically, motor homes, mobile homes and other portable shelter units are built of relatively lightweight, poorly insulated materials and utilize both venting and fixed window assemblies. Those windows which can be opened for ventilation frequently utilize a crank handle protruding into the living quarters of the portable shelter unit in order to crank open or close the windows. While this handle is removable, the stem to which it attaches and through which it activates the linkage of the window continues to protrude from the window frame. Thus, any auxiliary insulating window assembly to be attached over the existing window must be spaced outwardly from the wall enough to allow room for this handle stem Under the constant vibration of travel, and/or under the stress of expansion and contraction brought on by extremes of weather, as in the case of motor homes, experience has demonstrated that the frames of many existing insulating windows tend to sag, warp, or otherwise become separated from either the glass portion of the window assembly or from the wall of the portable shelter unit or both.

Certain prior art insulating frames utilize magnetic strips which allow an insulating window unit to be fastened directly to the metal frame of an existing window built into a portable shelter unit. However, this configuration provides minimal insulation and draft prevention, and does not allow room for the crank stem which protrudes from the frame of many types of windows.

It is known in the prior art to fasten a wood frame, as with two inch by two inch wood strips, to the wall of a portable shelter unit around the existing built-in window, and then fasten a storm window to that wood frame, thus providing some insulation and allowing room for the stem of the window crank handle. However, cracks and gaps are easily formed between the storm window and the wooden frame and the wooden frame and the wall, allowing drafts of cold outside air to enter and heated inside air to escape and this two by two construction is so labor intensive and expensive as to be impractical in most situations.

Most trailers, motor homes and other portable shelter units are extremely difficult to heat in cold weather. Their poor insulation and drafty windows combine to require large expenditures of heat energy and result in high heating bills. Typically such shelters are used by those who cannot afford conventional housing and who are ill equipped to pay large sums for custom made windows. Generally, large scale upgrading of the home's windows is possible only when bank financing can be obtained, and such financing is rigidly constrained by the collateral defined by the low overall cost of the shelter. Custom building windows to the shelter unit and building the described two by two frames generates so much cost as to create a total improvement cost that is such a large percentage of the home's value that banks and financiers will not grant loans for improvements because the total improved home value is inadequate as collateral. The present invention provides a functional window structure whose cost is so significantly reduced that financing can now be obtained, allowing such home owners a viable, warm alternative at an affordable price which allows utilization of bank financing.

SUMMARY OF THE INVENTION

The auxiliary insulating window of this invention is particularly characterized by its use of sag resisting chambers entrapping dead air within the frame of the insulating window assembly to provide additional insulative properties, as well as the use of inner and outer wall mounting flanges to seal the frame tightly to the wall, and insulative weather stripping about the periphery of the window unit to provide a flexible seal between the window and the frame which will overcome the effects of rapid and repeated expansion and contraction as well as the effects of significant vibration.

The insulating, sag resisting chambers of the window frame are formed by the use of multiple dividing walls within the frame. The multiple walls, which are preferably made of vinyl material or alternatively aluminum or other materials known to the art and suitable for the task, are arranged in such a manner so as to provide structural strength without adding a great deal of weight. It is desirable to keep the auxiliary insulating windows as light as possible, first because the auxiliary insulating windows should be easy to install and remove by the users of the portable shelter unit, and secondly because it is preferred to minimize overall weight of the temporary shelter unit in order to maintain the highest level of gasoline mileage possible, especially in the case of motor homes.

While the use of a single fastening flange for attaching an insulating window assembly to the wall of a portable shelter unit is known in the prior art, the use of fastening flanges on both the inner and outer sides of the periphery of the frame of the insulating window greatly inhibits the tendency of the frame to sag under the stress of travel, especially when lightweight materials such as vinyl are used in construction of the frame. Fastening flanges on both the inner and outer edges of the frame, through which screws are driven for attaching the auxiliary insulating window assembly to the inner side of the wall of the portable shelter unit, provide greater strength and resistance to sagging.

An additional sag resisting chamber is formed between the frame of the auxiliary insulating window and the wall of the portable shelter unit through the use of foam rubber weather stripping between the inner and outer flanges of the frame, through which installation screws are fastened to the wall, and the wall itself.

These and other objects and advantages of the invention will be readily understood as the following description is read in conjunction with the accompanying drawings, wherein like reference numerals have been used to designate like elements throughout the several views.

BRIEF DESCRIPTION OF THE DRAWINGS

FIG. 1 is a perspective view of a motor home, an example of a portable shelter unit with which the invention may be used, with a portion of a side wall cut away to show an installed auxiliary insulating window;

FIG. 2 is a vertical section view of the auxiliary insulating window taken along line 2—2 of FIG. 1; and FIG. 3 is an exploded perspective view of the auxiliary insulating window with the window unit exploded from the frame, showing an existing window and window molding about which the auxiliary insulating window is to be installed.

DESCRIPTION OF THE PREFERRED EMBODIMENT

With reference to the drawings, the improved auxiliary insulating window for mobile homes and other portable shelter units is indicated by reference numeral 10. The auxiliary insulating window 10 is usable in portable shelter units such as a motor home 12, although it may also be used on any of various other portable shelter units such as trailers, mobile homes or other types of pre-fabricated residential housing units which are transported from an assembly plant to a final permanent or semipermanent location. The auxiliary insulating window 10 includes a frame 14 and window unit 16 mountable to an inside wall 24 of a portable shelter unit surrounding a window and window molding assembly 26. In the preferred embodiment, the frame 14 is made of vinyl, although aluminum or other materials known to the art and suitable for the task may be used. Before mounting the auxiliary insulating window 10 to the inside wall 24, the crank handle 28 must be removed from the crank handle stem 30.

The window unit 16 is preferably a double pane window with a support structure 18, commonly made of aluminum, as best illustrated in FIG. 2, although the frame 14 may be modified for use of a single pane window unit. The typical support structure 18 includes an annular channel 20 within which are supported the window panes which are spaced apart by spacers 22. Between the window unit 16 and the frame 14 is positioned an insulating gasket 32. The window unit 16 is retained within the frame 14 by retaining means 34, which are preferably fastened to the second interposed partition 64.

The frame 14, having right, left, upper and lower sides, includes a first, or inner, fastening flange 36 and a second, or outer, fastening flange 38, each confronting the inside wall 24 of the portable shelter unit, as well as a wall confronting panel 40 between the two fastening flanges, a continuous flat surface being formed by the fastening flanges 36, 38 and the wall confronting panel 40. The first fastening flange 36 extends inwardly from the frame 14, and is flush with the inside wall 24, as is the second fastening flange 38, which extends outwardly from the frame 14. Both of the fastening flanges 36, 38 contain several bolt receiving holes 42 through which may be passed fasteners 44, such as bolts, for affixing the frame 14 to the inside wall 24. Fasteners 44 passing through bolt receiving holes 42 in the first fastening flange 36 must also pass through an insulating gasket 46, while fasteners 44 passing through bolt receiving holes 42 in the second fastening flange 38 must also pass through an insulating gasket 48. All insulating gaskets 32, 46 and 48 are preferably made of foam rubber, although other like materials may also be used.

The four sides of the frame 14 are identical in cross section, and may be formed of a continuous strip of appropriate design, having been cut to the proper dimensions and then having the corners beveled to approximately a 45° angle. The four sides of the frame 14 may then be permanently joined as by welding in the case of a vinyl frame, or by the use of fasteners in the case of aluminum. In cross section, as may best be seen in FIG. 2, the preferred embodiment of the frame 14 includes three compartments, or insulating, sag resisting chambers 50, 52 and 54. The insulating, sag resisting chambers 50, 52 and 54 are defined by the intersections of the first support member 56, the second support member 58, and the third support member 60, which project from the wall confronting panel 40, with the first interposed partition 62 and the second interposed partition 64. The first insulating, sag resisting chamber 50 is bounded by the wall confronting panel 40, the first support member 56, the second support member 58 and the first interposed partition 62. The second insulating, sag resisting chamber 52 is bounded by the wall confronting panel 40, the second support member 58, the third support member 60 and the first interposed partition 62. The third insulating, sag resisting chamber 54 is bounded by the first interposed partition 62, the second support member 58, the third support member 60 and the second interposed partition 64. When the four sides of the frame are assembled as described above, the three insulating, sag resisting chambers 50, 52 and 54 are in communication with their complementary member of the adjoining side of the frame, and three continuous, annular chambers are formed about the periphery of the window. These chambers serve to add insulative properties to the frame, which may not be composed of a highly insulative material. Further, the reinforcing structure of the intersection of the various partitions and support members serves to add strengthening properties to the frame, which may not be composed of a highly rigid material. Although the preferred embodiment of the invention provides for window units 16 using double panes of glass, modifications may be made to the frame 14 of the auxiliary insulating window 10 to accommodate single pane window units as well. One such modification consists of forming an additional insulating, sag resisting chamber by extending the first support member 56 and adding a third interposed partition intermediate the second support member 58 and the end of the extended first support member 56.

An insulating chamber 66 is also formed once the frame is attached to the inside wall 24 of the portable shelter unit. This insulating chamber 66 is bounded by the inside wall 24, insulating gasket 46, insulating gasket 48 and the continuous surface formed by first fastening flange 36, wall confronting panel 40 and second fastening flange 38. The insulating chamber 66 further adds to the heat insulative properties of the frame 14 and the auxiliary insulating window 10 by entrapping dead air within the chamber.

In operation, the frame 14 is attached to the inside wall 24 of the portable shelter unit. This attachment is accomplished by running bolts or other fasteners 44 through the bolt receiving holes 42 of the first and second fastening flanges 36, 38. Fasteners 44 passing through the first fastening flange 36 also pass through insulating gasket 46, while fasteners 44 passing through the second fastening flange 38 also pass through insulating gasket 48. Thus, when the frame is tightly fastened to the inside wall 24, an air tight insulating chamber 66 is formed. After fastening the frame 14 to the inside wall 24, insulating gasket 32 is positioned about the inner perimeter of the frame 14, abutting the exposed portion of first interposed partition 62. Then the window unit 16 is securely positioned within the frame 14, the insulating gasket 32 confronting the support structure 18 of the window unit 16. The window unit 16 is then held tightly in place by retaining means 34 fastened to the frame 14, and spaced about the periphery of the window unit 16. The window and window molding assembly 26 are then isolated from the interior of the portable shelter unit, and the inside air of the portable shelter unit is protected from the cold, outside air that pass through lightweight, poorly insulated original window and window molding assemblies 26. Further, even if the portable shelter unit should be exposed to high levels of vibration or rapid changes in climate due to traveling in different regions or over great distances, the construction of the auxiliary insulating window 10 resists sagging, warping and separation from the inside wall 24 of the portable shelter unit.

It is anticipated that various changes may be made in the size, shape, and construction of the auxiliary insulating window of the device disclosed herein without departing from the spirit and scope of the invention as defined by the following claims.

What is claimed is:

1. An insulated auxiliary storm window assembly with improved heat insulating properties for use on the inside wall of mobile homes, trailers and other portable shelter units and usable in combination with an existing window and window molding to reduce heat loss from the window and molding and obtain a tight sealing relationship where substantial expansion and contraction changes are encountered and where the shelter unit may undergo substantial vibration due to travel and weather forces, comprising:

a frame entirely surrounding and enclosing said existing window and window molding and attachable to the inside wall of the portable shelter unit;

a glass window unit having an outer periphery;

retaining means for attaching said window unit to said frame;

said frame including a first fastening flange confronting said inside wall and extending generally inwardly from said frame and a second fastening flange confronting said inside wall extending generally outwardly from said frame;

mounting means for attaching said first and second flanges to said inside wall;

a first gasket intermediate said periphery of said window unit and said frame;

a second gasket intermediate said first flange and said inside wall of said shelter unit;

a third gasket intermediate said second flange and said inside wall of said shelter unit;

said frame includes an upper member, a lower member and left and right side members;

said upper and lower members and said left and right side members include:

a wall confronting panel intermediate said first fastening flange and said second fastening flange with a flat inner surface which is spaced from and confronting said inside wall;

first, second and third support members projecting from said wall confronting panel, said first support member spaced from said second support member and said second support member spaced from said third support member;

a first interposed partition intermediate said first support member and said third support member and intersecting said second support member, forming a first insulating, sag resisting chamber and a second insulating, sag resisting chamber to trap dead air therein, said first insulating, sag resisting chamber bounded by said wall confronting panel, said first support member, said second support member and said first interposed partition, and said second insulating, sag resisting chamber bounded by said wall confronting panel, said second support member, said third support member and said first interposed partition; and a second interposed partition intermediate said second support member and said third support member, a third insulating, sag resisting chamber to trap dead air therein being bounded by said first interposed partition, said second support member, said third support member and said second interposed partition.

2. An insulated auxiliary storm window assembly as defined in claim 1 wherein:

said upper and lower members and said left and right side members define an insulating chamber to trap dead air therein bounded by the surface formed by said wall confronting panel and said first and second fastening flanges of said upper and lower members and said left and right side members, said second gasket, said third gasket, and said inside wall of said portable shelter unit.

3. An insulated auxiliary storm window assembly as defined in claim 2 wherein:

said first, second and third insulating, sag resisting chambers and said insulating chamber of said upper and lower members and said left and right members of said frame communicate with like chambers of adjacent members forming annular chambers surrounding said existing window and window molding.

4. An insulated auxiliary storm window assembly with improved heat insulating properties for use on the inside wall of mobile homes, trailers and other portable shelter units and usable in combination with an existing window and window molding to reduce heat loss from the window and molding and obtain a tight sealing relationship where substantial expansion and contraction changes are encountered and where the shelter unit may undergo substantial vibration due to travel and weather forces, comprising:

a frame entirely surrounding and enclosing said existing window and window molding and attachable to the inside wall of the portable shelter unit;

a glass window unit having an outer periphery;

retaining means for attaching said window unit to said frame;

said frame including a first fastening flange confronting said inside wall and extending generally inwardly from said frame and a second fastening flange confronting said inside wall extending generally outwardly from said frame;

mounting means for attaching said first and second flanges to said inside wall;

said frame includes an upper member, a lower member and left and right side members;

said upper and lower members and said left and right side members include:

a wall confronting panel intermediate said first fastening flange and said second fastening flange with a flat inner surface which is spaced from and confronting said inside wall;

first, second and third support members projecting from said wall confronting panel, said first support member spaced from said second support member and said second support member spaced from said third support member;

a first interposed partition intermediate said first support member and said third support member and intersecting said second support member, forming a first insulating, sag resisting chamber and a second insulating, sag resisting chamber to trap dead air therein, said first insulating, sag resisting chamber bounded by said wall confronting panel, said first support member, said second support member and said first interposed partition, and said second insulating, sag resisting chamber bounded by said wall confronting panel, said second support member, said third support member and said first interposed partition; and a second interposed partition intermediate said second support member and said third support member, forming a third insulating, sag resisting chamber to trap dead air therein bounded by said first interposed partition, said second support member, said third support member and said second interposed partition.

5. An insulated auxiliary storm window assembly as defined in claim 4 wherein:

said first, second and third insulating, sag resisting chambers of said upper and lower members and said left and right members of said frame communicate with like chambers of adjacent members forming annular chambers surrounding said existing window and window molding.

6. An insulated auxiliary storm window assembly with improved heat insulating properties for use on the inside wall of mobile homes, trailers and other portable shelter units and usable in combination with an existing window and window molding to reduce heat loss from the window and molding and obtain a tight sealing relationship where substantial expansion and contraction changes are encountered and where the shelter unit may undergo substantial vibration due to travel and weather forces, comprising:

a frame entirely surrounding and enclosing said existing window and window molding and attachable to the inside wall of the portable shelter unit;

a glass window unit having an outer periphery;

retaining means for attaching said window unit to said frame;

means to attach said frame to said inside wall;

gasket means intermediate said means to attach said frame to said inside wall and said inside wall of said portable shelter unit;

said frame includes an upper member, a lower member and left and right side members;

said upper and lower members and said left and right side members include:

a wall confronting panel with a flat inner surface which is spaced from and confronting said inside wall;

first, second and third support members projecting from said wall confronting panel, said first support member spaced from said second support member and said second support member spaced from said third support member;

a first interposed partition intermediate said first support member and said third support member and intersecting said second support member, forming a first insulating, sag resisting chamber and a second insulating, sag resisting chamber to trap dead air therein, said first insulating, sag resisting chamber bounded by said wall confronting panel, said first support member, said second support member and said first interposed partition, and said second insulating, sag resisting chamber bounded by said wall confronting panel, said second support member, said third support member and said first interposed partition; and a second interposed partition intermediate said second support member and said third support member, forming a third insulating, sag resisting chamber to trap dead air therein bounded by said first interposed partition, said second support member, said third support member and said second interposed partition.

7. An insulated auxiliary storm window assembly as defined in claim 6 wherein:

said gasket means includes first and second spaced apart gaskets intermediate said means to attach said frame to said inside wall and said inside wall of said portable shelter unit; and said upper and lower members and said left and right side members form an insulating chamber to trap dead air therein bounded by said wall confronting panel of said upper and lower members and said left and right side members, said first gasket, said second gasket, and said inside wall of said portable shelter unit.

* * * * *